(12) United States Patent
De Caigny et al.

(10) Patent No.: US 12,298,743 B2
(45) Date of Patent: May 13, 2025

(54) MANUFACTURING SYSTEM FOR MONITORING AND/OR CONTROLLING ONE OR MORE CHEMICAL PLANT(S)

(71) Applicant: BASF SE, Ludwigshafen (DE)

(72) Inventors: Jan De Caigny, Ludwigshafen (DE); Bart Van Loon, Ludwigshafen (DE); Sebastian Gau, Ludwigshafen (DE); Daniel Engel, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 17/782,864

(22) PCT Filed: Dec. 8, 2020

(86) PCT No.: PCT/EP2020/085128
§ 371 (c)(1),
(2) Date: Jun. 6, 2022

(87) PCT Pub. No.: WO2021/116122
PCT Pub. Date: Jun. 17, 2021

(65) Prior Publication Data
US 2023/0009093 A1 Jan. 12, 2023

(30) Foreign Application Priority Data
Dec. 13, 2019 (EP) ..................... 19216178

(51) Int. Cl.
G05B 19/418 (2006.01)
H04L 41/14 (2022.01)

(52) U.S. Cl.
CPC ........ *G05B 19/4183* (2013.01); *H04L 41/145* (2013.01); *G05B 2219/31282* (2013.01)

(58) Field of Classification Search
CPC ...... G05B 19/4183; G05B 2219/31282; H04L 41/145
(Continued)

(56) References Cited

U.S. PATENT DOCUMENTS 10,129,211 B2 * 11/2018 Heath .................... G06Q 30/02
11,132,650 B2 * 9/2021 Penilla ...................... G06F 9/00
(Continued)

FOREIGN PATENT DOCUMENTS

CN 106020138 A 10/2016
GB 2556445 A 5/2018
(Continued)

OTHER PUBLICATIONS

Bradshaw et al., A scalable approach to deploying and managing appliances, TERAGRID 2007 Conference. p. 1-8 Madison. Wisconsin. 6 on. (2007). (Year: 2007).*
(Continued)

*Primary Examiner* — Tauqir Hussain
(74) *Attorney, Agent, or Firm* — LOWENSTEIN SANDLER LLP

(57) ABSTRACT

A system (10) for monitoring and/or controlling one or more chemical plant(s) (12) including at least one processing layer (14, 16, 32, 34), wherein the at least one processing layer (14, 16, 32, 34) is associated with a secure network (20) and communicatively coupled to an interface (26) for providing process or asset specific data or process applications to an external processing layer (30), wherein the at least one processing layer (14, 16, 32, 34) is configured to add a transfer tag to the process or asset specific data or to the process application and to provide the process or asset specific data or the process application based on the transfer tag.

15 Claims, 8 Drawing Sheets

(58) Field of Classification Search
USPC .......................................................... 709/201
See application file for complete search history.

(56) References Cited

U.S. PATENT DOCUMENTS

| | | | | |
|---|---|---|---|---|
| 11,144,042 | B2* | 10/2021 | Thomsen | G06F 1/163 |
| 11,150,622 | B2* | 10/2021 | Lee | G05B 19/406 |
| 11,203,355 | B2* | 12/2021 | Penilla | G06F 21/64 |
| 11,243,505 | B2* | 2/2022 | Strohmenger | G05B 23/0237 |
| 11,243,927 | B2* | 2/2022 | Lin | G06F 16/212 |
| 11,244,556 | B2* | 2/2022 | MR | G05B 15/02 |
| 11,249,462 | B2* | 2/2022 | Thomsen | G06Q 10/10 |
| 11,270,699 | B2* | 3/2022 | Penilla | G01C 21/3641 |
| 11,294,551 | B2* | 4/2022 | Penilla | H04L 63/0861 |
| 11,327,473 | B2* | 5/2022 | Sayyarrodsari | G06Q 50/04 |
| 11,347,191 | B2* | 5/2022 | Hsu | G06N 7/01 |
| 11,348,033 | B2* | 5/2022 | Akella | G06N 20/00 |
| 11,370,313 | B2* | 6/2022 | Penilla | B60L 50/52 |
| 11,400,537 | B2* | 8/2022 | Ivkovich | B23K 9/10 |
| 11,403,541 | B2* | 8/2022 | Thomsen | G05B 13/041 |
| 11,487,274 | B2* | 11/2022 | Valder | H04L 12/2818 |
| 11,513,477 | B2* | 11/2022 | Strohmenger | G05B 15/02 |
| 2005/0198416 | A1* | 9/2005 | Kim | G06F 13/4273 710/100 |
| 2006/0184804 | A1* | 8/2006 | Varma | G06F 12/0897 713/193 |
| 2008/0082354 | A1 | 4/2008 | Hurry et al. | |
| 2010/0201489 | A1* | 8/2010 | Griffin | G06F 21/6245 340/10.1 |
| 2014/0047107 | A1* | 2/2014 | Maturana | G05B 15/02 709/224 |
| 2016/0292895 | A1 | 10/2016 | Billi et al. | |
| 2016/0320768 | A1* | 11/2016 | Zhao | G05B 23/0281 |
| 2016/0330222 | A1 | 11/2016 | Brandt et al. | |
| 2017/0351226 | A1 | 12/2017 | Bliss et al. | |
| 2021/0067328 | A1* | 3/2021 | Verheyen | H04L 63/0442 |
| 2022/0404803 | A1* | 12/2022 | Sayyarrodsari | H04W 4/38 |

FOREIGN PATENT DOCUMENTS

| | | |
|---|---|---|
| JP | 2004030020 A | 1/2004 |
| JP | 2004171557 A | 6/2004 |
| JP | 5340938 B2 | 11/2013 |
| WO | WO-2016/065493 A1 | 5/2016 |
| WO | WO-2019/138120 A1 | 7/2019 |

OTHER PUBLICATIONS

Bradshaw et al., A scalable approach to deploying and managing appliances, TERAGRID 2007 Conference, Madison, Wisconsin, 6 pp. (2007).
International Application No. PCT/EP2020/085128, International Search Report and Written Opinion, mailed Feb. 12, 2021.
Chinese Office Action and English translation for Chinese Patent Application No. 202080086119.9 dated Mar. 16, 2024, 15 pages.
Technology Blogs by SAP, "Practical Industrial IoT Security: SAP's Digital Manufacturing Landscape", Jan. 30, 2018, 17 pages.
Office Action with English translation for Japanese Patent Application No. 2022-535745 dated Jan. 30, 2025, 8 pages.

* cited by examiner

MANUFACTURING SYSTEM FOR MONITORING AND/OR CONTROLLING ONE OR MORE CHEMICAL PLANT(S)

CROSS-REFERENCE TO RELATED APPLICATIONS

This is the U.S. national phase of International Application No. PCT/EP2020/085128, filed Dec. 8, 2020, which claims the benefit of European Patent Application No. 19216178.4, filed Dec. 13, 2019.

FIELD

The invention relates to a system for monitoring and/or controlling one or more chemical plant(s) including at least one processing layer.

BACKGROUND

Chemical production is a highly sensitive production environment particularly with respect to security. Chemical plants typically include multiple assets to produce the chemical product. Multiple sensors are distributed in such plants for monitoring and control purposes and collect masses of data. As such chemical production is a data heavy environment. However, to date the gain from such data to increase production efficiency in one or multiple chemical plants has not been fully leveraged.

Applying new technologies in cloud computing and big data analytics is hence of great interest. Unlike other manufacturing industries, however, process industry is subject to very high security standards. For this reason, computing infrastructures are typically siloed with highly restrictive access to monitoring and control systems. Owing to such security standards, latency and availability considerations contravene a simple migration of to date embedded control systems to e.g. a cloud computing system. Bridging the gap between highly proprietary industrial manufacturing systems and cloud technologies is one of the major challenges.

WO2016065493 discloses a client device and a system for data acquisition and pre-processing of process-related mass data from at least one CNC machine or an industrial robot and for transmitting said process-related data to at least one data recipient, e.g. a cloud-based server is described. The client device comprises at least one first data communication interface to at least one controller of the CNC machine or industrial robot, for continuously recording hard-realtime process-related data via at least one realtime data channel, and for recording non-realtime process-related data via at least one non-realtime data channel. The client device further comprises at least one data processing unit data-mapping at least the recorded non-realtime data to the recorded hard-realtime data to aggregate a contextualized set of process-related data. Moreover, the client device comprises at least one second data interface for transmitting the contextualized set of process-related data to the data recipient and for further data communication with the data recipient.

WO2019138120 discloses a method for improving a chemical production process. A plurality of derivative chemical products are produced through a derivative chemical production process based on at least some derivative process parameters at a respective chemical production facility, which chemical production facilities each comprises a separate respective facility intranet. At least some respective derivative process parameters are measured from the derivative chemical production process by a respective production sensor computer system within each facility intranet. A process model for simulating the derivative chemical production process is recorded in a process model management computer system outside the facility intranets.

US20160320768A1 discloses an example network environment for monitoring plant processes with system computers operating as a root-cause analyzer. The system computers communicate with the data server to access collected data for measurable process variables from a historian database. The data server is communicatively coupled to a distributed control system (DCS) in turn communicating collected data to the data server over communications network.

The object of the present invention relates to a highly scalable and flexible computing infrastructure for process industry, which adheres to the high security standards.

SUMMARY

Proposed is a system for monitoring and/or controlling one or more chemical plant(s) including at least one processing layer and optionally an external processing layer, wherein the at least one processing layer is associated with, configured, situated of hosted in or inside a secure network and communicatively coupled to an interface for providing process or asset specific data or process applications to an external processing layer, optionally wherein the external processing layer is configured to provide process or asset specific data or process applications to the at least one processing layer, wherein the at least one processing layer or optionally the external processing layer is configured to add a transfer tag to the process or asset specific data or to the process application and to transfer or provide the process or asset specific data or the process application based on the transfer tag.

Proposed is further a method for monitoring and/or controlling one or more chemical plant(s) including at least one processing layer and optionally an external processing layer, wherein the at least one processing layer is associated with a secure network and communicatively coupled to an interface for providing process or asset specific data or process applications to an external processing layer, optionally wherein the external processing layer is configured to provide process or asset specific data or process applications to the at least one processing layer, wherein the method comprises the steps of:
  adding a transfer tag, via the at least one processing layer or optionally the external processing layer, to the process or asset specific data or to the process application and
  transferring or providing the process or asset specific data or the process application, via the at least one processing layer or optionally external processing layer, based on the transfer tag, optionally wherein the process or asset specific data or the process application is transferred or provided based on the transfer tag from the at least one processing layer to the external processing layer, optionally wherein the process or asset specific data or the process application is transferred or provided based on the transfer tag from the external processing layer to the at least one processing layer.

The present invention further relates to a (distributed) computer program or computer program product with computer-readable instructions that, when executed on one or more processor(s), cause the processor(s) to perform methods for monitoring and/or controlling one or more chemical plant(s) as described herein. The invention further relates to a computer readable non-volatile or non-transitory storage medium with computer-readable instructions that, when executed on one or more a processor(s), cause the processor(s) to perform methods for monitoring and/or controlling one or more chemical plant(s) as described herein.

The proposed systems, method and computer programs allow for highly efficient and secure data handling in communication with external system components or even third-party systems. The proposed systems, method and computer programs allow for data exchange with an external processing layer outside the secure network or even third-party systems completely detached from the system infrastructure while adhering to high security standards in chemical industry. By introducing different process and storage system layers and communicatively coupling them, the mass data transfer and handling is distributed over different layers allowing for more flexibility in contextualization, storage and access for process application. In particular, the proposed system can accommodate multiple chemical plants via the second processing layer. Hence the system is highly scalable enabling more reliable and more enhanced monitoring and/or controlling of chemical plant(s).

By adding the transfer tag on the lowest level possible, i.e. where the data or the application is generated, the transfer tag becomes an inherent part of any data point or application as soon as it is generated and follows the data on its path through the proposed system. Such transfer tag enables seamless, but secure integration of external data sources or external applications as well as transfer of data or application to external resources. For instance, the deployment of process applications ingesting external data can be streamlined for multiple assets even in multiple chemical plants in or inside different secure networks or by different manufacturers across the value or manufacturing chain. Similarly, the deployment of external process applications ingesting internal data can be streamlined for multiple assets even in multiple plants in or inside different secure networks or by different manufacturers across the value or manufacturing chain. Bridging any external network or enterprise limits between chemical plants in different secure networks or by different manufacturers across the value chain may hence be performed without compromise on security.

The following description relates to the system, the method, the computer program, the computer readable storage medium lined out above. In particular the systems, the computer programs and the computer readable storage media are configured to perform the method steps as set out above and further described below.

In the context of the present invention chemical plant refers to any manufacturing facility based on chemical processes, e.g. transforming a feedstock to a product using chemical processes. In contrast to discrete manufacturing, chemical manufacturing is based on continuous or batch processes. As such monitoring and/or controlling of chemical plants is time dependent and hence based on large time series data sets. A chemical plant may include more than 1.000 sensors producing measurement data points every couple of seconds. Such dimensions result in multiple terabytes of data to be handled in a system for controlling and/or monitoring chemical plants. A small-scale chemical plant may include a couple of thousand sensors producing data points every 1 to 10s. For comparison a large-scale chemical plant may include a couple of tenthousand sensors, e.g. 10.000 to 30.000, producing data points every 1 to 10s. Contextualizing such data results in the handling of multiple hundred gigabytes to multiple terabytes.

Chemical plants may produce a product via one or more chemical processes transforming the feedstock via one or more intermediate products to the product. Preferably a chemical plant provides an encapsulated facility producing a product, that may be used as feedstock for the next steps in the value chain. Chemical plants may be large-scale plants like oil and gas facilities, gas cleaning plants, carbon dioxide capture facilities, liquefied natural gas (LNG) plants, oil refineries, petro-chemical facilities or chemical facilities. Upstream chemical plants in petrochemicals process production for example include a steamcracker starting with naphtha being processed to ethylene and propylene. These upstream products may then be provided to further chemical plants to derive downstream products such as polyethylene or polypropylene, which may again serve as feedstock for chemical plants deriving further downstream products. Chemical plants may be used to manufacture discrete products. In one example one chemical plant may be used to manufacture precursors for polyurethane foam. Such precursors may be provided to a second chemical plant for the manufacture of discrete products, such as an isolation plate comprising polyurethane foam.

The value chain production or manufacturing chain via various intermediate products to an end product can be decentralized in various locations or integrated in a Verbund site or e chemical park. Such Verbund sites or chemical parks comprise a network of interconnected chemical plants, where products manufactured in one plant can serve as a feedstock for another plant.

Chemical plants may include multiple assets, such as heat exchangers, reactors, pumps, pipes, distillation or absorption columns to name a few of them. In chemical plants some assets may be critical. Critical assets are those, which when disrupted critically impact plant operation. This can lead to manufacturing processes being compromised. Reduced product quality or even manufacturing stops may the result. In the worst-case scenario fire, explosion or toxic gas release may be the result of such disruption. Hence such critical assets may require more rigorous monitoring and/or controlling then other assets depending on the chemical processes and the chemicals involved. To monitor and/or control chemical processes and assets multiple actors and sensors may be embedded in the chemical plant. Such actors or sensors may provide process or asset specific data relating to individual assets or processes, e.g. the state of an individual asset, the state of an individual actor, the composition of a chemical, or the state of a chemical process. In particular, process or asset specific data include one or more of the following data categories:

process operation data, such as composition of a feedstock or an intermediate product,
process monitoring data, such as flow, material temperature,
asset operation data, such as current, voltage, and
asset monitoring data, such as asset temperature, asset pressure, vibrations.

Process or asset specific data refers to data relating to a specific asset or process and contextualized with respect to such specific asset or process. Process or asset specific data may be contextualized only with respect to individual assets and processes. Process or asset specific data may include measurement value, data quality measure, time, measurement unit, asset identifier for specific assets or process identifier for a specific process sections or stages. Such process or asset specific data may be collected on the lowest processing layer or the first processing layer and contextualized with respect to specific assets or processes in a single plant. Such contextualization may relate to context available on the first processing layer. Such context may relate to a single plant.

Plant specific data refers to process or asset specific data that is contextualized with respect to one or more plant(s). The transfer tag may be added to the asset and process specific data and as such also be part of plant specific data. This way the transfer tag remains even if contextualized via different processing layers. Such plant specific data may be collected on the second processing layer and contextualized with respect to multiple plants. Plant specific data may be tagged with the transfer tag directly or indirectly by tagging asset and process specific data in the respective layer configured for contextualization. Specifically, contextualization may relate to context available on the second processing layer. Via contextualization context such as plant identifier, plant type, reliability indicator, or alarm limits for the plant may be added to process or asset specific data points. In a further step technical asset structure of one or more plant(s), a Verbund site, other asset management structure (e.g. asset network), or application context (e.g. model identifier, third party exchange) may be added. Such overarching context can originate from functional locations or digital twins, such as digital piping and instrumentation diagrams, 3D models or scans with xyz coordinates of the plant assets. Additionally or alternatively local scans from mobile devices linked to e.g. piping and instrumentation diagrams may be used for contextualization.

In one aspect the processing layer or external processing layer is configured to initiate, prevent or control the process of providing or transferring of process or asset specific data or process applications according to the transfer tag. Transferring or providing in this context may include blocking, communicating to or from any processing layer or between systems inside different secure networks. In the context of the present invention a transfer tag determines if data or applications may be blocked or communicated to, from or between processing layers or processing systems in the layered architecture of the system. In the context of the present invention a transfer tag further determines if data or applications may be blocked or communicated to, from or between systems inside different secure networks. As such the transfer tag may set a trigger to allow or prevent data or application to be communicated between processing layers, processing systems or two systems situated in or inside separate secure network environments. The transfer tag for instance signifies if process or asset specific data, the contextualized process or asset specific data in form of plant specific data or the process application may be blocked or may be communicated between processing layers or processing systems of the proposed system. The transfer tag may signify, if process or asset specific data, the contextualized process or asset specific data in form of plant specific data or the process application may be blocked or may be communicated to or from an external processing layer or system. The transfer tag may signify, if process or asset specific data, the contextualized process or asset specific data in form of plant specific data or the process application may be blocked or may be communicated to or from a third-party processing layer or system.

Each dataset or application may be tagged with individual transfer tags. Or in other words the transfer tag may be applied to each data set of process or asset specific data or of plant specific data or to each process application. The transfer tag may be applied to more than one data set of process or asset specific data or plant specific data or to more than one process application. The transfer tag may be applied to a combination of data sets of process or asset specific data or of plant specific data and/or process applications.

In particular, plant specific data e.g. relating to interfaces between chemical plants in a manufacturing chain may be provided e.g. between chemical plants across a manufacturing chain via on the second processing layer or the external processing layer. Thus, monitoring and/or controlling, e.g. via anomaly detection, setpoint steering and optimization in manufacturing chains across multiple plants, can be enhanced. For monitoring and/or controlling the chain across multiple plants process applications with online in/out data profiles may be used. Such data profiles and process applications may be transferred between plants in the manufacturing chain via the second processing layer or the external processing layer. Combined with mass and energy balances that can be monitored, such process applications may optimize the full chain across chemical plants rather than individual plants in the chain The process of contextualization refers to linking data points available in one or more storage unit(s). Such unit(s) may be persistent or non-volatile storage. Data points may relate to measurement values or context information. Storage unit(s) may be part of the first processing layer, the second processing layer, the external processing layer or distributed across two or more of those layers. The linking may be generated dynamically or statically. E.g. pre-defined or dynamically generated scripts may generate dynamic or static links between information data points in one processing layer or across processing layers. Links may be established by generating a new data object including the linked data itself and storing such new data object in a new instance. Any data point stored may be actively deleted, if a copy is stored elsewhere. Any data point thus copied from one storage unit to a new data object in the same or another storage unit may be deleted to reduce storage space. Additionally, or alternatively links may be established by generating a meta data object with embedded links to address or access respective data points in distributed storage unit(s). Any data point thus addressable or accessible through the meta data object may remain in its original storage unit. Linking such information to form a new data object may still be performed e.g. on the external processing layer. For the retrieval of data either data objects are accessed directly or meta data objects are used to address or access the data distributed in one or more storage unit(s). Any operations on such data such as applications may either access such data directly, may access a non-persistent image of such data, e.g. from cache memory, or a persistent copy of the data.

In one aspect the first processing layer is associated with one or a single chemical plant. The first processing layer may be a core process system including one or more processing devices and storage devices. Such layer may include one or more distributed processing and storage devices forming a programable logic controller (PLC) system or decentralized control system (DCS) with control loops distributed throughout the chemical plant. Preferably the first processing layer is configured to control and/or monitor chemical processes and assets on the asset level. Hence the first processing layer monitors and/or controls the chemical plant on the lowest level. Furthermore, the first processing layer may be configured to monitor and control critical assets. Additionally or alternatively, the first processing layer is configured to provide process or asset specific data to the second processing layer. Such data may be provided directly or indirectly to the second processing layer.

In a further aspect the second processing layer is associated with more than one chemical plant. The second processing layer may include a process management system with one or more processing and storage devices. Preferred the second processing layer is configured to manage data transfer to and/or from the first processing layer. Further preferred the second processing layer is configured to host and/or orchestrate process applications. Such process applications may monitor and/or control one or more chemical plant(s) or one or more asset(s). The process management system may be associated with one or more chemical plants.

The second processing layer may further include a process management system and an intermediate processing system. The second processing layer may include a process management system with one or more processing and storage devices. Preferred the second processing layer or process management system is configured to manage data transfer to and/or from the first processing layer. Further preferred the second processing layer or process management system is configured to host and/or orchestrate process applications. Such process applications may monitor and/or control one or more chemical plant(s) or one or more asset(s). The process management system may be associated with one or more chemical plants. In other words, the process management system may be communicatively coupled to multiple first processing layers associated with one or more chemical plant(s).

In a further aspect the second processing layer may comprise an intermediate processing system and a process management system. Here the intermediate processing system may be communicatively coupled to the first processing layer, preferably the core process system, and the process management system may be communicatively coupled to the intermediate layer. Preferably the first processing layer and the process management system are coupled or communicatively coupled via the intermediate processing system. The intermediate processing system may be configured to collect process or asset specific data provided by the first processing layer. The process management system may be configured to provide plant specific data of one or more chemical plant(s) to the interface to the external network. The intermediate processing system may be associated with one or more chemical plants. In other words, the intermediate processing system may be communicatively coupled to first processing layer of one chemical plant or to multiple first processing layers of multiple plants. The process management system may be communicatively coupled to one or multiple intermediate processing systems. Adding the intermediate processing level to the second processing layer adds a further security layer. It fully detangles the virulent first processing layer from any external network access. Additionally, the intermediate level allows for more enhanced data handling by reducing data transfer rates to the external processing layer via pre-processing and enhancing data quality by contextualization. The intermediate processing system and process management system may comprise one or more processing and storage devices.

The at least one processing layer may be configured to contextualize the process and the asset specific data or process applications by adding a transfer tag. The system may include a first processing layer, a second processing layer and optionally an external processing layer.

The first processing layer may be configured to contextualize the process or asset specific data by adding the transfer tag. The second processing layer or the external processing layer may be configured to contextualize process applications by adding the transfer tag. The external processing layer or the second processing layer, in particular the process management system, may be configured to receive external data or external applications and may be configured to contextualize external data or external applications by adding the transfer tag.

In a further aspect the secure network is a segregated network including more than two security zones separated by firewalls. Such firewalls may be network or host-based virtual or physical firewalls. The firewall may be hardware- or software-based to control incoming and outgoing network traffic. Here predetermined rules in the sense of a white listing may define allowed traffic via access management or other configuration settings. Depending on the firewall configuration the security zones may adhere to different security standards.

In further aspect unidirectional or bidirectional communication, e.g. data transfer or data access, may be realized for data streams between different processing layers. One data stream may include process or asset specific data from the first processing layer being passed to and contextualized via the second processing layer and communicated to the external processing layer. Contextualization may be performed on the second processing layer, the external processing layer or both. Furthermore, depending on criticality of the process or asset specific data or the plant specific data such data may be assigned for unidirectional or bidirectional communication. E.g. data communication from the second or external processing layers to critical assets may be prohibited by realizing a diode type communication channel. Such communication may only allow for unidirectional communication from the critical asset to the processing layers but not vice versa.

In further aspect data streams may be assigned critical or non-critical data. Critical data refers to data that is critical to operate the chemical plant, such as short-term data, from which operation points of the chemical plant are derived. Such critical data may cover a short term horizon of, e.g. hours or days up one or more week(s), which is required to operate the plant in its optimal state. Non-critical data refers to data that is not critical to operate the chemical plant, such as mid- to long-term data for monitoring the chemical plant based on mid- to long-term behavior.

Such non-critical data may cover a mid- to long-term time horizon, e.g. multiple weeks or months up to one or more year(s), which is required to monitor and/or control asset(s) or plant(s) e.g. over a time span. Such data may also be referred to as cold, warm and hot data, wherein the hot data corresponds to critical data, the warm data corresponds to mid-term non-critical data and cold data corresponds to long-term non-critical data.

The second processing layer, preferably the process management system, may be communicatively coupled to an external processing layer via an external network. The second processing layer, preferably the process management system, may be configured to manage data transfer to and/or from the external processing layer. The second processing layer, preferably the process management system, may for instance provide plant specific data to the interface to the external network based on an identifier added by way of contextualization. Such identifier may be a confidentiality identifier based on which such data is not provided to the interface to the external network.

The external processing layer may be a computing or cloud environment providing virtualized computing resources, like data storage and computing power. The external processing layer may provide a private, hybrid, public, community or multi cloud environment. Cloud environments are advantageous, since they provide on demand storage and computing power. Additionally, in cases where multiple chemical plants operated by different parties are to be monitored and/or controlled, data or process applications affecting the chemical plants may be shared in such cloud environment.

In a further aspect the second processing layer, preferably the process management system, is configured to manage data transfer to and/or from the external processing layer in real-time or on demand. Real-time transfer may be buffered depending on network and computing loads on the interface to the external network. On demand transfer may be triggered in a predefined or dynamic manner. Preferred the data transfer to the external processing layer is managed in real-time and the transfer from the external processing layer is managed on demand.

In the context of this disclosure transfer includes receiving as well as transmitting data. Hence data push or pull situations are captured.

In the context of this disclosure internal refers the secure network and any system components or communications that are associated with the secure network. The secure network may be defined by a physical or virtual network boundary. Physical network boundaries are realized in hardware. Virtual network boundaries are realized in software.

External or third-party refers to any network or any components outside the secure network. This may be a different or third-party secure network, an external network or an open network. Hence any communications crossing the outmost boundary of a secure network of a chemical plant, e.g. by crossing the boundary to a different secure network, to an external network or to an open network, may be considered an external transfer or communication or a transfer or communication to an external component. Third-party networks or components refer to external networks or components, that are controlled by the third party, which may be identified. Hence the secure network is separate from any third-party or external network and any connection or communication between such separate networks may be actively initiated. The secure network may have further secure zone inside.

The transfer tag may be added on or via the processing layer the process or asset specific data or the process application is generated. In other words, the processing layer may be configured to add a transfer tag to process or asset specific data or the process application on generation. Alternatively, the transfer tag may be added on or via the processing layer functioning as the entry point or the first entry point into the system or the processing layer. Hence the transfer tag may be added on the processing layer the data is transferred to or first received by the system or the processing layer. In other words, the processing layer may be configured to add a transfer tag to process or asset specific data or the process application on entry into the system or the processing layer. In this context entry point means that the process or asset specific data is not generated but transferred to the system or the processing layer.

The transfer tag may include at least two transfer settings, wherein the at least two transfer settings relate to confidentiality settings and/or third-party transfer settings. The confidentiality settings may comprise at least two levels, such as confidential or non-confidential. The confidentiality setting may comprise for example three or four levels, such as strictly confidential, confidential, and non-confidential or strictly confidential, confidential, internal and non-confidential. The third-party transfer settings may comprise a third-party identifier, an information category or both. Depending on the sensitivity of the data or the application, the transfer tag may have entries for confidentiality settings and third-party transfer settings.

The transfer tag may be assigned dynamically or statically, where the data or application is generated or first enters the system or processing layer. The transfer tag may be pre-defined for processes or assets generating data. The transfer tag may be dynamically assigned to third-party data or applications, depending on e.g. a compliance check. The transfer tag may be added on or via the processing layer the data or application is generated or the closest possible processing layer after generation in terms of time or location. E.g. if a measurement is transferred to the first processing layer in the plant, the tag may be added in that processing layer, or if an application is compiled on the external processing layer in the cloud, the transfer tag may be added in that processing layer. In other embodiments the transfer tag may be generated when a data transfer to or from a system inside a secure network is triggered.

The processing layer may be configured to contextualize the process and the asset specific data or process applications by adding the transfer tag. Contextualizing specifically process or asset specific data on the processing layer allows for full control over the data generated in chemical plants. The contextualization may be performed on generation or at least prior to the first transfer inside the system in order to ensure such control through all processing layers.

The processing layer, preferably the second processing layer, or the interface of the processing layer, preferably the second processing layer, to the external network may be configured to provide contextualized process or asset specific data or process applications to the external processing layer based on the transfer tag. Here the processing layer or its interface may be configured prohibit transfer to the external processing layer based on confidentiality settings or third-party settings of the transfer tag. In one embodiment the interface may be configured to prohibit transfer to the external processing layer, if contextualized process or asset specific data or process applications are tagged with a predefined confidentiality setting, such as strictly confidential or confidential.

In another embodiment the interface may be configured to prohibit transfer to the external processing layer, if contextualized process or asset specific data or process applications are tagged with a third-party setting signifying internal use only. This way any data transfer or communication from and to chemical plants is highly secure avoiding data or application leaks. Combined with the layered processing system comprising at least two processing layers associated with a secure network adds to such security, since only one of the processing layers has an external network exposure.

The process application may be a containerized application associated with a process or asset model for monitoring and/or controlling one or more chemical plant(s). In the present context a containerized application refers to an application which may be executed in an encapsulated runtime environment independent of a host's operating system. The application may hence be viewed to run in a sandbox. The containerized application may be based on a container image containing the application. The container image may include software components, e.g. hierarchical tree of software components, required to execute the respective application in an encapsulated runtime environment. Such containerized application may be stored in a registry of or associated with one of the internal processing layers or the external processing layer.

To deploy a containerized application an orchestration application associated with the processing layer, particularly the second processing layer, or the external processing layer may manage execution of the containerized application. Such management may include general runtime environment configurations such as storage or network to run the containerized application. Such management may further include a host assignment defining a central master node or a distribution among one or more computing node(s) to execute the application on the first processing layer, the second processing layer or the external management layer. In particular such assignment of computing resources depends on the input data, the load indicator, or the system layer tag.

The input data may include real time data from sensors and non-real time data. Such data may relate to machinery, such as machinery type or sensor data measured with respect to the machinery, chemicals, such as chemicals type or sensor data measured with respect to chemical components processed in the chemical plant, processes, such as chemical process type or sensor data measured with respect to the chemical processes performed in the chemical plant, and/or plant, such as plant type or sensor data measured with respect to the chemical plant, e.g. environmental measurement data.

The asset or plant model may include a data-driven or a kinetic model providing e.g. a health status, an operation forecast, an event forecast or an event trigger. The asset or plant model may be based on a mere data-driven model, a hybrid model combining data-driven and kinetic models or a mere kinetic model. The asset or plant model may further be based on a scenario matrix mapping input data, e.g. sensor data, to specific events. The asset model may reflect the physical behavior of a single or multiple asset(s). The plant model may reflect the physical behavior of parts of one or more plant(s), a full plant or multiple plants.

The processing layer or the external processing layer may be configured to provide contextualized process and asset data or process applications to a third-party or external system based on the transfer tag. The processing layer or the external processing layer may be configured to perform a third-party compliance check before transfer to the third-party system. The processing layer or the external processing layer may be configured to access a third-party compliance database and to determine transfer compliance based on the third-party transfer setting including a third-party identifier and at least one information category. Such information may signify third party allowed or not allowed.

The processing layer or the external processing layer may be configured to manage containerized applications. The system may include a first processing layer associated with an individual chemical plant and a second processing layer associated with one or more chemical plant(s).

The first processing layer may be configured to contextualize the process and asset specific data by adding the transfer tag. The second processing layer or the external processing layer may be configured to contextualize process applications by adding the transfer tag.

The processing layer or the external processing layer may be configured to receive external data or external applications. This way different systems including processing layers inside a secure network can be seamlessly integrated. Hence external data or external applications hosted in a first system including processing layers inside a secure network and optionally an external processing layer may be transmitted to a second system including processing layers inside a secure network and optionally an external processing layer.

In one embodiment the external application may be transmitted from the first system to the second system to execute on internal data stored by the second system. In another embodiment the external data may be transmitted from the first system to the second system to execute an internal application stored by the second system. The latter option may result in more data traffic than the former option.

In a further embodiment the processing layer or the external processing layer is configured to contextualize external data or external applications by adding the transfer tag. The settings of the transfer tag may for instance relate to confidentiality or third-party transfer settings. For instance depending on the confidentiality setting of data required by an external application, such application may be contextualized according to the processing layer storing such data and be transmitted to on the respective processing layer the data is stored by. Or a third party setting may be added and depending on the third-party setting external data may be allowed to be communicated to a processing layer to ingest the internal data stored on such layer. In a multi-layer system setup with multi system connectivity, the transfer tag increases flexibility in controlling data or application flows between different systems. In addition, such an approach gives the option to safeguard data or application integrity depending on sensitivity.

In a further embodiment the processing layer or the external processing layer is configured to deploy external applications depending on third-party transfer setting signifying internal data ingestion. The internal data ingestion information may for instance include metadata allowing to allocate the required internal data. In such case the transfer tag may allow for more controlled routing of external applications in a multilayer system setup with multi system connectivity. For instance, if an external application enters a first system form a second system the transfer tag allows for linking the internal data to be ingested or deploying the external application on the layer storing the internal data.

In a further embodiment the processing layer or the external processing layer is configured to contextualize internal applications by adding the third-party transfer setting signifying external data ingestion. The external data ingestion information may for instance include metadata allowing to allocate the internal application ingesting such external data. In such case the transfer tag allows for more controlled routing of external data in a multilayer system setup with multi system connectivity. For instance, if external data enters a first system form a second system the transfer tag allows for linking the external data stream to the internal application ingesting such data.

In a further embodiment the processing layer or the external processing layer is configured to deploy internal applications depending on the third-party transfer setting of the external data ingestion. For deployment the internal application may be deployed on a processing layer, which provides the external data access. This may be the processing layer of a first system such external data is provided to from a second system. In other circumstances this may be the processing layer of a first system with respective computing power or capacities and external data provided from a second system may be provided to such processing layer of the first system. The external processing layer or the processing layer, preferably the second processing layer, may be configured to receive external data or external applications. The external processing layer or the processing layer, preferably the second processing layer, may be configured to contextualize external data or external applications by adding the transfer tag. The transfer tag for external applications may specify e.g. the confidentiality setting of the internal data to be ingested or the need for internal data ingestion. The external processing layer or the processing layer, preferably the second processing layer, may be configured to deploy external applications depending on third-party transfer setting of the internal data to be ingested or signifying internal data ingestion. This way the layered processing architecture can be leveraged in that the external application may be deployed on the processing layer that hosts respective internal data. Alternatively, the external application may be deployed on any processing layer and the link to the internal data to be ingested may be provided.

In a further aspect the external processing layer or the processing layer, preferably the second processing layer, is configured to contextualize internal applications by adding the third-party transfer setting signifying external data ingestion. In other words, the transfer tag may signify that an internal application requires external data as input data. The external processing layer or the processing layer, preferably the second processing layer, may be configured to contextualize external data by adding the transfer tag. The external processing layer or the processing layer, preferably the second processing layer, may be configured to contextualize internal applications by adding the third-party transfer setting signifying external data ingestion. The external processing layer or the processing layer, preferably the second processing layer, may be configured to deploy internal applications depending on third-party transfer setting of the external data ingestion.

BRIEF DESCRIPTION OF THE DRAWINGS

Example embodiments of the present disclosure are illustrated in the appended drawings. It is to be noted, however, that the appended drawings illustrate only particular embodiments of the present disclosure and are therefore not to be considered limiting of its scope. The technical teaching may encompass other equally effective embodiments.

DETAILED DESCRIPTION

Figure 1:
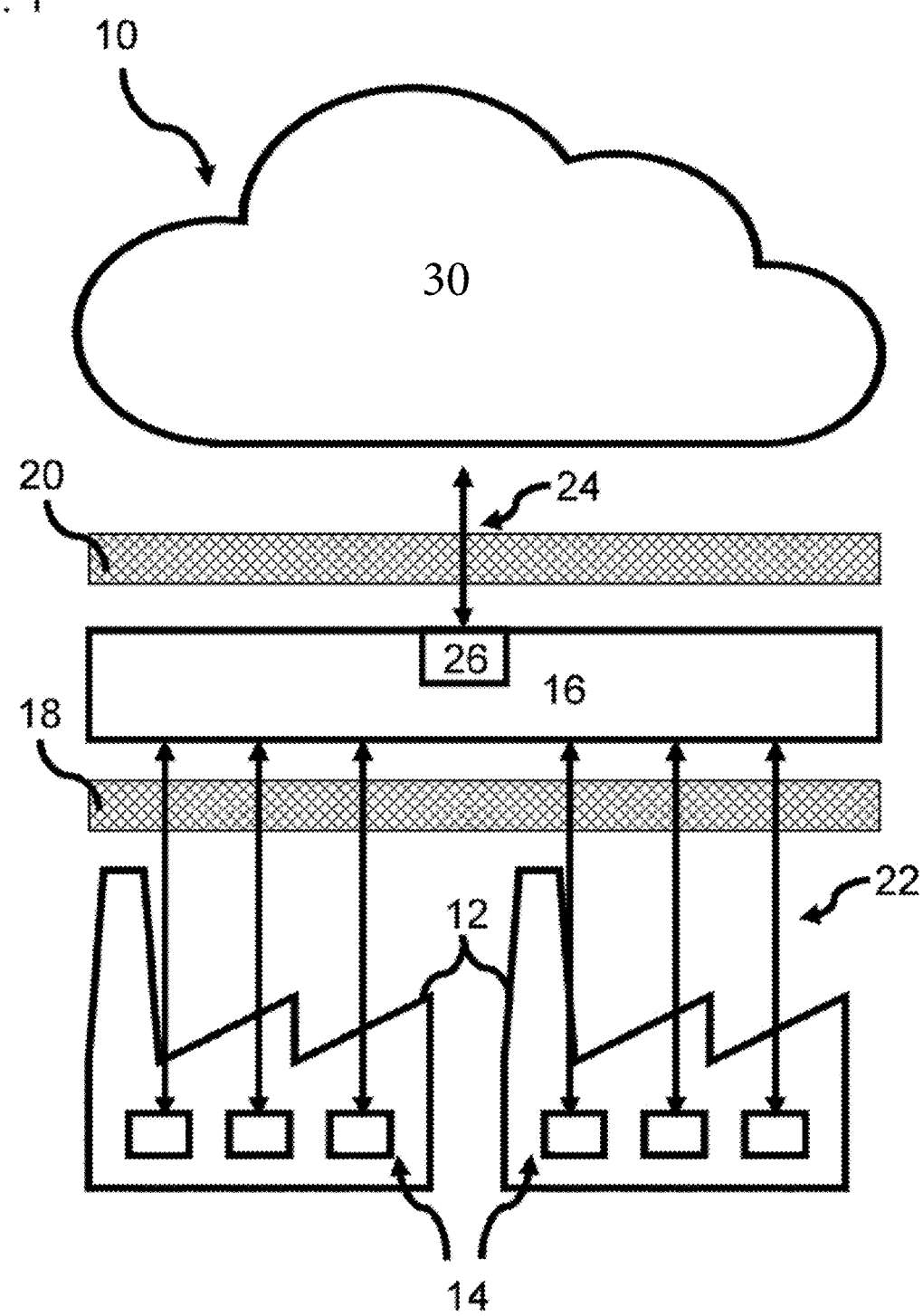
FIG. 1 shows a first schematic representation of the system for monitoring and/or controlling one or more chemical plant(s).

In petrochemicals process industrial production typically starts with upstream products, which are used to derive further downstream products. To date the value chain production via various intermediate products to an end product is highly restrictive and based on siloed infrastructure. This hampers introduction of new technologies such as IoT, cloud computing and big data analytics.

Unlike other manufacturing industries, process industry is subject to very high standards in particular with regard to availability and security. For this reason, computing infrastructures are typically unidirectional and siloed with highly restrictive access to monitoring and control systems of chemical plants.

In general chemical production plants are embedded in an enterprise architecture in a siloed way with different levels to make a functional separation between operational technology and information technology solutions.

Level 0 relates to the physical processes and defines the actual physical processes in the plant. Level 1 relates to intelligent devices for sensing and manipulating the physical processes, e.g. via process sensors, analyzers, actuators and related instrumentation. Level 2 relates to control systems for supervising, monitoring and controlling the physical processes. Real-time controls and software; DCS, human-machine interface (HMI); supervisory and data acquisition (SCADA) software are typical components. Level 3 relates to manufacturing operations systems for managing production work flow to produce the desired products. Batch management; manufacturing execution/operations management systems (MES/MOMS); laboratory, maintenance and plant performance management systems, data historians and related middleware are typical components. Time frames for controlling and monitoring may be shifts, hours, minutes, seconds. Level 4 relates to business logistics systems for managing the business-related activities of the manufacturing operation. ERP is the primary system and establishes the basic plant production schedule, material use, shipping and inventory levels. Time frame may be months, weeks, days, shifts.

Additionally, such structures adhere to strict one-way communication protocols allowing for no data flow into level 2 or below. Not covered in such architectures is the company or enterprise-external internet. The model remains, however, an essential concept within the realm of Cyber Security. Within this context, the challenge is to leverage the benefits of Cloud computing and Big Data, while still guaranteeing the established advantages of existing architectures: i.e. the high availability and reliability of the lower levels system (Level 1 and Level 2), that control the chemical plant, as well as the cyber security.

The technical teaching presented here allows for enhancing monitoring and/or control changing this framework in a systematic way, to introduce new capabilities that are compatible with existing architectures. The present disclosure specifically relates to a highly scalable, flexible and available computing infrastructure for process industry, which at the same time adheres to the high security standards.

FIG. 1 shows a first schematic representation of the system 10 for monitoring and/or controlling chemical plants 12.

The system 10 comprises two processing layers including the first processing layer in the form of a core process system 14 associated with each of the chemical plants 12 and the second processing layer 16, e.g. in the form of a process management system, associated with two chemical plants 12. The core process system 14 is communicatively coupled to the second processing layer 16 allowing for unidirectional or bidirectional data transfer. The core process system 14 comprises a decentralized set of processing units associated with assets of the chemical plant 12.

The core process system 14 and the second processing layer 16 are configured in the secure network 18, 20, which in the schematic representation includes two security zones. The first security zone is situated on the core process system 14 level, where the first firewall 18 controls incoming and outgoing network traffic to and from the core process system 14. The second security zone is situated on the second processing layer 16, where the second firewall 20 controls incoming and outgoing network traffic to and from the second processing layer 16. Such segregated network architecture allows to shield vulnerable plant operations from cyberattacks.

The core process system 14 provides process or asset specific data 22 of the chemical plant 12 to the second processing layer 16. The second processing layer 16 is configured to contextualize the process or asset specific data of the chemical plants 12. The second processing layer 16 is further configured to provide plant specific data 24 of the chemical plants 12 to the interface 26 to the external network. Here the plant specific data may refer to contextualized process or asset specific data.

Process or asset specific data may include value, quality, time, measurement unit, asset identifier. Via contextualization further context such as plant identifier, plant type, reliability indicator, or alarm limits for the plant may be added. In a further step technical asset structure of one or multiple plant(s) or a site and other asset management (e.g. asset network), plus application context (e.g. model identifier, third party exchange) may be added.

The second processing layer 16 is communicatively coupled to an external processing layer 30 via interface 26 to the external network. The external processing layer 30 may be a computing or cloud environment providing virtualized computing resources, like data storage and computing power. The second processing layer 16 is configured to provide plant specific data 24 from one or more chemical plants 12 to the external processing layer 30. Such data may be provided in real time or on demand. The second processing layer 16 is configured to manage data transfer to and/or from the external processing layer in real-time or on demand. The second processing layer 16 may for instance provide plant specific data 24 to the interface 26 to the external network based on an identifier added by way of contextualization. Such identifier may be a confidentiality identifier based on which such data is not provided to the interface 26 to the external network. The second processing layer 16 may be further configured to delete at least parts of the data transferred to the external processing layer 30.

The external processing layer 30 is configured to aggregate plant specific data from more than one chemical plant and/or to store historical data from more than one chemical plant. This way data storage can be externalized, and the required on-premise storage capacities can be reduced plus history transfer is made redundant. Additionally, such storage concept allows to store historical data on the second processing layer 16 for a hot window, which is a critical time window allowing the system 10 to monitor and/or control the chemical plant in island mode without external network connection. This way availability of the system 10 for monitoring and/or controlling is always guaranteed.

The second processing layer 16 and the external processing layer 30 are configured to host and/or orchestrate process applications. In particular the second processing layer 16 may host and/or orchestrate process applications relating to core plant operations and the external processing layer 30 may be configured to host and/or orchestrate process applications relating to non-core plant operations.

Furthermore, the second processing layer 16 and the external processing layer 30 may be configured to exchange data with 3rd party management systems, e.g. via integration of 3rd party external processing layer, to orchestrate data visualization, to orchestrate computing process workflows, to orchestrate data calculations, to orchestrate APIs to access data, to orchestrate metadata of data storage, transfer and calculation, to provide interactive plant data working environment for users, e.g. operators and to verify and improve data quality.

Figure 2:
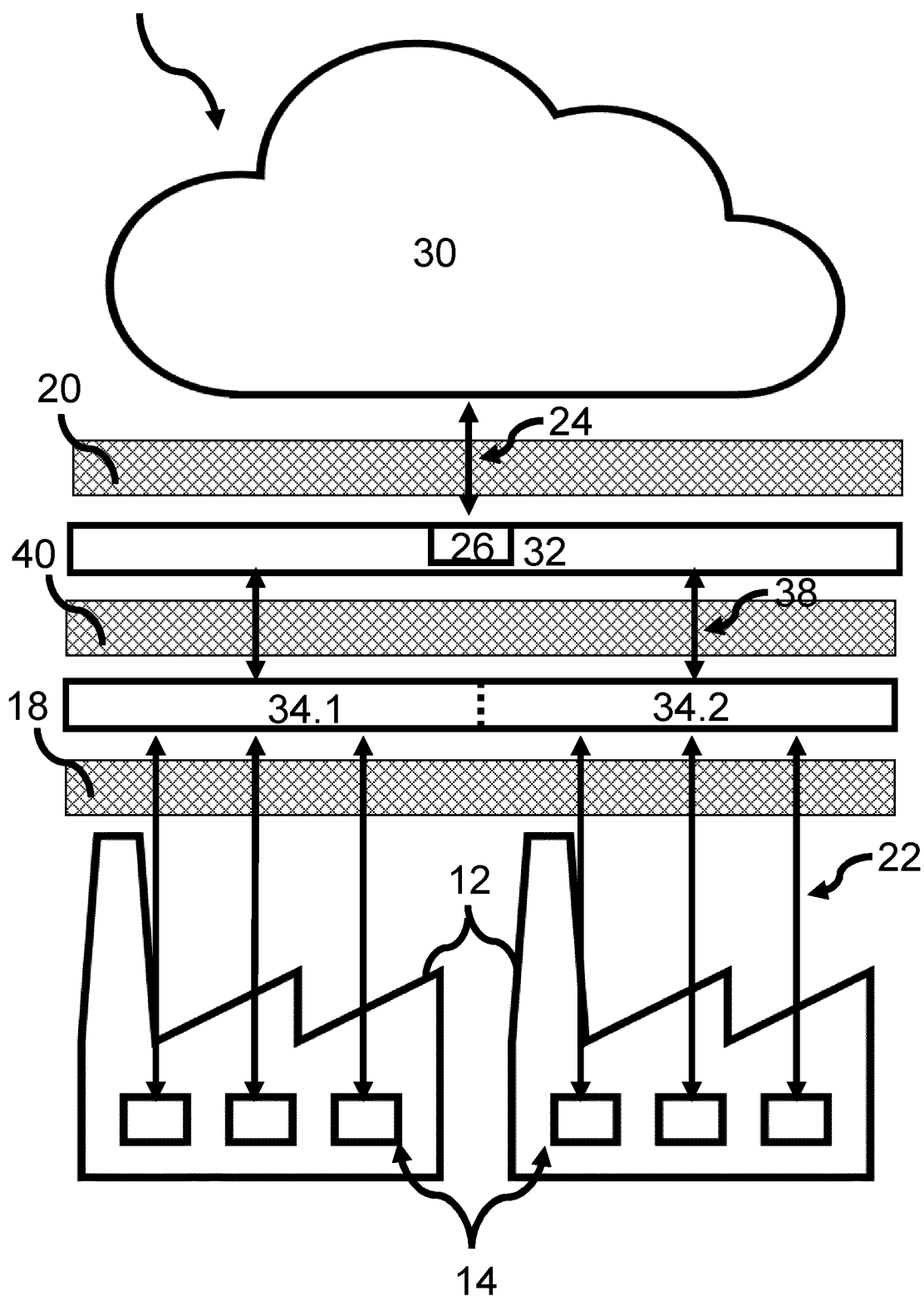
FIG. 2 shows a second schematic representation of the system for monitoring and/or controlling one or more chemical plant(s).

FIG. 2 shows a second schematic representation of the system 10 for monitoring and/or controlling one or more chemical plant(s) 12.

The system 10 shown in FIG. 2 is similar to the system shown in FIG. 1. However, the system of FIG. 2 has a second processing layer with a process management system 32 and an intermediate processing system 34. The intermediate processing systems 34.1, 34.2 is configured in a security zone of the secure network via firewall 40.

The intermediate processing systems 34.1, 34.2 may be configured to ingest process or asset specific data 22 from individual or multiple chemical plants 12. Such data is contextualized on a plant level in intermediate processing system 34.1, 34.2 and plant specific data 38 may be provided to the process management system 32, where further contextualization e.g. across plant levels on Verbund or site level may be performed. In this setup the data contextualization is staggered across the different system 10 layers with each layer 14, 34, 32 mapping context information available in the respective layer 14, 34, 32.

Figure 3:
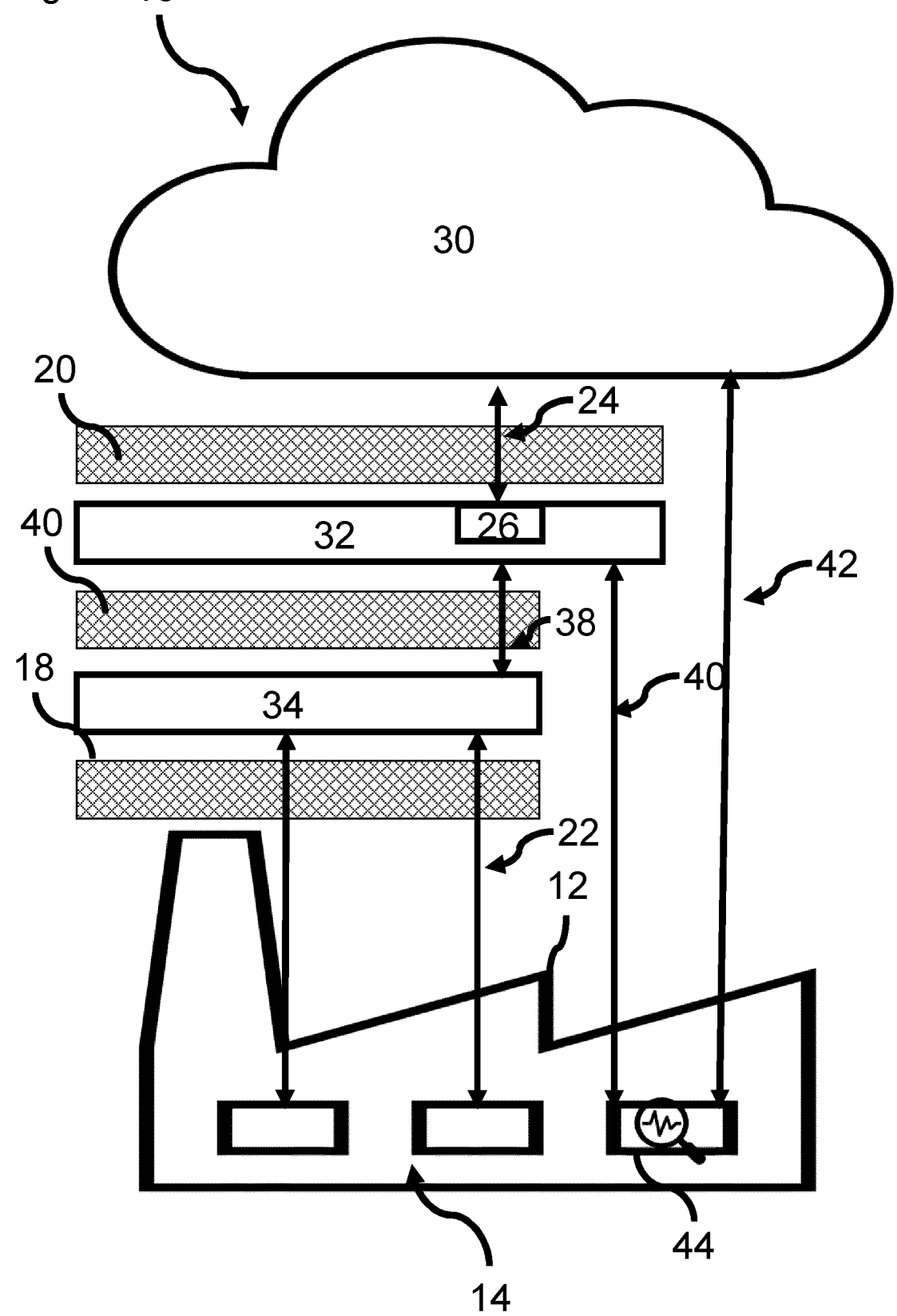
FIG. 3 shows a third schematic representation of the system for monitoring and/or controlling one or more chemical plant(s).

FIG. 3 shows a third schematic representation of the system 10 for monitoring and/or controlling one or more chemical plant(s) 12.

The system 10 shown in FIG. 3 is similar to the systems shown in FIGS. 1 and 2. However, the system of FIG. 3 includes monitoring devices 44, which are communicatively coupled to the process management system 32 or the external processing layer 30. The monitoring device 36 may be configured to transfer monitoring data to process management system 32 or the external processing layer 30. The process management system 32 or the external processing layer 30 may be configured to manage multiple monitoring devices 44. Since such IoT devices are not considered reliable, monitoring data provided by the monitoring device 44 may be tagged unidirectional, and any control loop relating to the chemical plant 12 may include a filter for such tag. Thus, such data will not be used for any control of the chemical plant 12.

Figure 4:
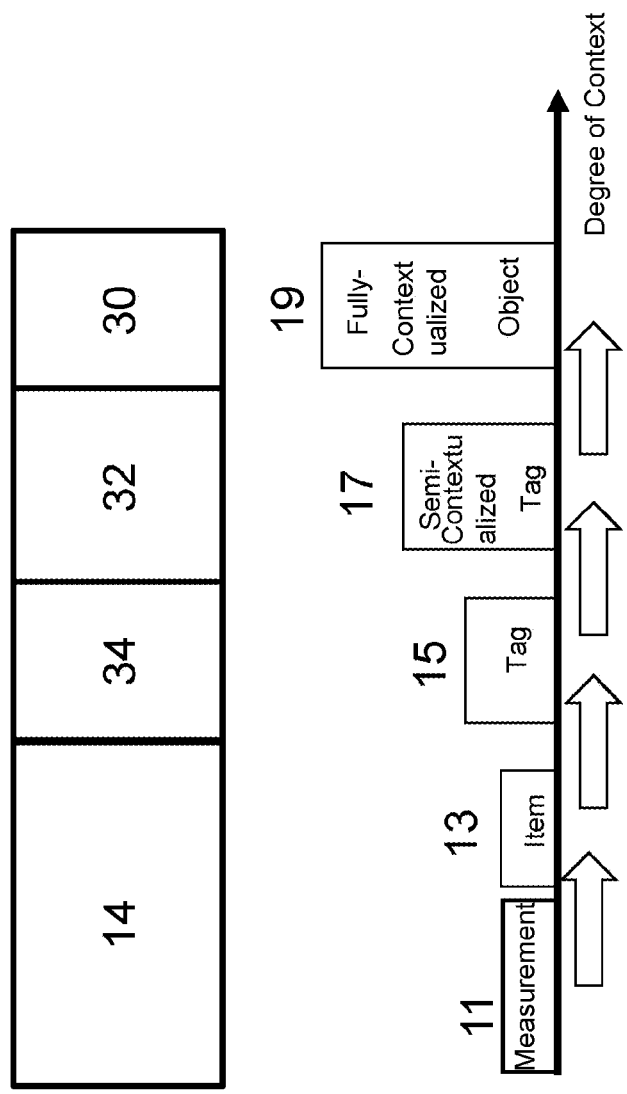
FIG. 4 shows a schematic representation of the data contextualization concept in systems like those shown in FIGS. 1 to 3.

FIG. 4 shows a schematic representation of the data contextualization concept in systems 10 like those shown in FIGS. 1 to 3.

The systems 10 of FIGS. 1 to 3 include two internal processing layers 14, 16, 32, 34 and the external processing layer 30. The first processing layer 14 may be a decentralized control system for supervising, monitoring and controlling the physical processes in the chemical plant 12. The first processing layer 14 may be configured to provide process or asset specific data. The second processing layer 16, 32, 34 may include the intermediate processing system 34 and the process management system 32. The intermediate processing system 34 may be configured as an edge computing layer. Such layer may be associated to Level 3 for individual plants. The intermediate processing system 34 may be configured for collecting process or asset specific data,
interaction with basic automation systems from Level 2,
initial contextualization (bottom-up approach), wherein context is added based on what is known on Level 2 and Level 1 and within the decentralized edge device, The process management system 32 may be configured as centralized edge computing layer. Such layer may be associated to Level 4 for multiple plants. The process management system 32 may be configured for:
integration of data from different decentralized edge devices including the intermediate processing system 34 or monitoring devices 44,
further contextualization (bottom-up approach), wherein additional context is added based on preprocessed context in the decentralized within the decentralized edge devices.

The external processing layer 30 may be configured as centralized cloud computing platform. Such platform may be associated with Level 5 for multiple plants. The external processing layer 30 may be configured as manufacturing data workspace with full data integration across multiple plants including manufacturing data history transport & streaming, collection of all data from all edge components. This way the full contextualization of all lower level context may be integrated in the on the external processing layer 30 for multiple plants. Thus the external processing layer 30 may be further configured to
run cloud-native apps,
connect with external PaaS and SaaS tenants,
integrate machine learning with manufacturing data & processes, train-test-deploy,
visualize data, access apps, orchestrate.

By way of system architecture a bottom-up contextualization concept may be realized. Such concept is shown in FIG. 4. In the bottom-up concept all information that is available on the lower-levels may already be added to the data as attributes, such that lower level context is not lost. Here the first processing layer 14 as the lowest context level may include measurement values 11, which are contextualized with respect to the item 13 the measurement was conducted with. The intermediate processing system 34 may further contextualize by adding further tags 15 relating to the individual chemical plant 12. The process management system 32 may further contextualize by adding tags 17 relating to multiple chemical plants 12 and/or business information. The external processing layer 30 may further contextualize by adding tags 19 relating to multiple plants and/or external context information, e.g. from third parties.

The contextualization concept may cover at least two fundamental types of context. One type may be the functional location within the production environment comprising multiple chemical plants. This may cover information about what and where this data point represents inside the production environment. Examples are the connection with a functional location, an attribute with respect to which physical asset the data is collected, etc. This context may be beneficially used for later applications, since it explains which data is available for which plants and assets.

Another type may be confidentiality categorization. Such tag may be added on the lowest level possible and this information may be propagated to further processing layers. Such tag may be added automatically or manually. With technical measures e.g. via a filter embedded into the firewalls, it may be prohibited automatically, that "strictly confidential" data is integrated all the way up to the external processing layer 30. Sharing of data with externals will lead to an automatic notification that "confidential data" is being shared. An automatic contractual check may be implemented to see whether this data can be shared with this external.

Overall the contextualization concept realized in such way allows for highly efficient data usage in process applications deployed on any layer of the system.

Figure 5:
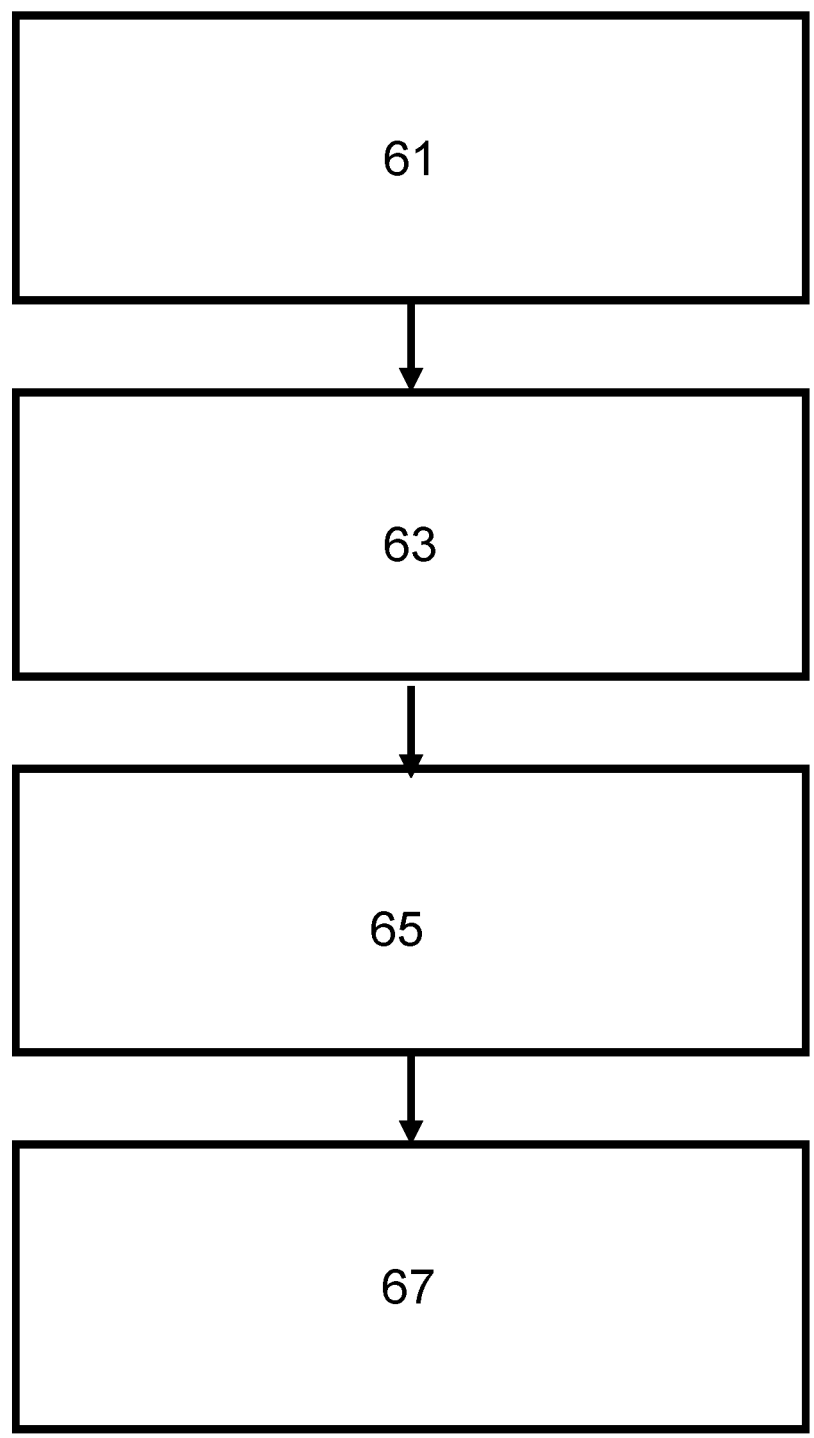
FIG. 5 shows a flowchart in a schematic representation of the method for monitoring and/or controlling one or more chemical plant(s).

FIG. 5 shows a flowchart in a schematic representation of the method for monitoring and/or controlling one or more chemical plant(s).

Preferably the method is performed on a distributed computing system as shown in FIGS. 1 to 3 comprising a first processing layer 14 associated with the chemical plant 12 and communicatively coupled to a second processing layer 16, 32, 34. The method may perform all steps as described in the context of FIGS. 1 to 4, including any steps relating to contextualization, data handling, process application management and monitoring device management.

In a first step, 61, process or asset specific data of the chemical plant 12 is provided via the first processing layer 14 to the second processing layer 16, 32, 34.

In a second step 63, process or asset specific data is contextualized via the second processing layer 16, 32, 34 to generate plant specific data.

In a third step, 65, plant specific data of one or more chemical plant(s) 12 is provided via the second processing layer 16, 32, 34 to the interface 26 to the external network.

In a fourth step, 67, one or more chemical plant(s) are monitored and/or controlled via the second processing layer 16, 32, 34 or the first processing layer 14 based on the process or asset specific data or the plant specific data. Monitoring and/or controlling of the one or more chemical plant(s) 12 may be conducted via the second processing layer 16, 32, 34 or the external processing layer 30 based on the plant specific data. Additionally, monitoring and/or controlling may be conducted via the first processing layer 14 based on the process or asset specific data. Such monitoring and/or controlling may be performed through process applications ingesting respective data and providing monitoring and/or controlling output as further lined out in FIGS. 6 to 8.

Figure 6:
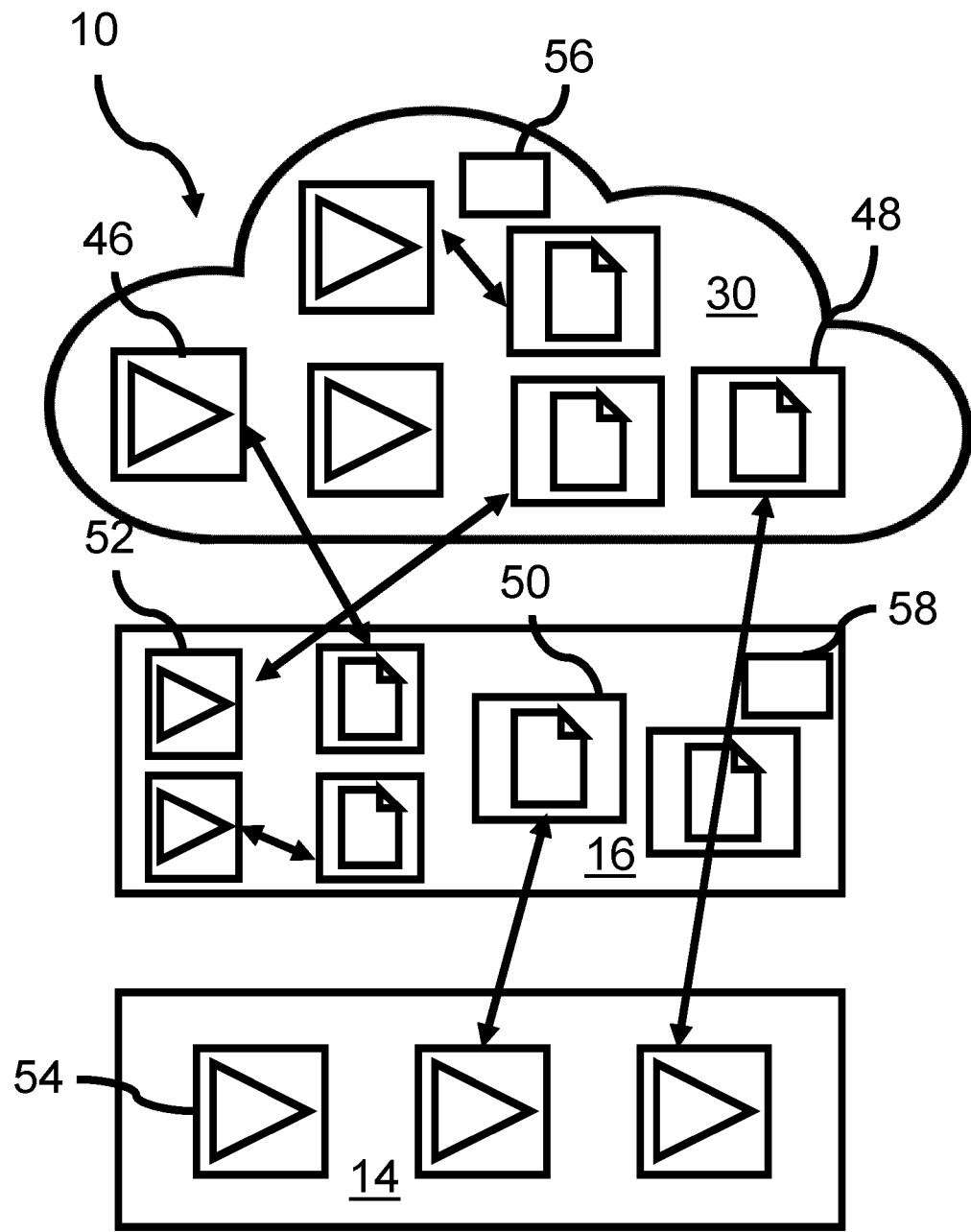
FIG. 6 shows a schematic representation of systems for monitoring and/or controlling one or more chemical plant(s) via containerized applications.

FIG. 6 shows a schematic representation of the distributed computing system for monitoring and/or controlling one or more chemical plant(s) with multiple assets via a distributed computing system 10 with more than two deployment layers 14, 16, 30.

The schematic of FIG. 6 represents containerized application orchestration in different deployment layers 14, 16, 30. The system 10 includes an external processing system 30, a second processing layer 16 and a first processing layer 14. Here the second processing layer 16 may include larger storage and computing resources than the first processing layer 14, and/or the external processing layer 30 may include larger storage and computing resources than the second processing layer 16. The system's 10 architecture and functionalities may adhere to the architectures and functionalities described with respect to FIGS. 1 to 3. In particular the first and the second processing layer 14, 16 may be configured in a secure network 20, 40, 18. The first processing layer 14 may be communicatively coupled to the second processing layer 16 and the second processing layer 16 may be communicatively coupled to the external processing layer 30 via an external network 24.

The orchestration applications 56, 58 may be hosted by the external processing layer 30 and the second processing layer 16, 32, 34 respectively. Hence containerized applications or container images 48, 50 may be stored in a registry of the external processing layer 30 and the second processing layer 16, 32, 34 respectively. The containerized applications 48, 50 for execution may include one or more operations to ingest input data, to provide the input data to respective asset or plant model(s) generating output data and to provide the generated output data for controlling and/or monitoring the chemical plant 12. This way the external processing layer 30 and the second processing layer 16, 32, 34 act as facilitating layers reducing the computing and storage resources required on the first processing layer 14 on the asset level.

Figure 7:
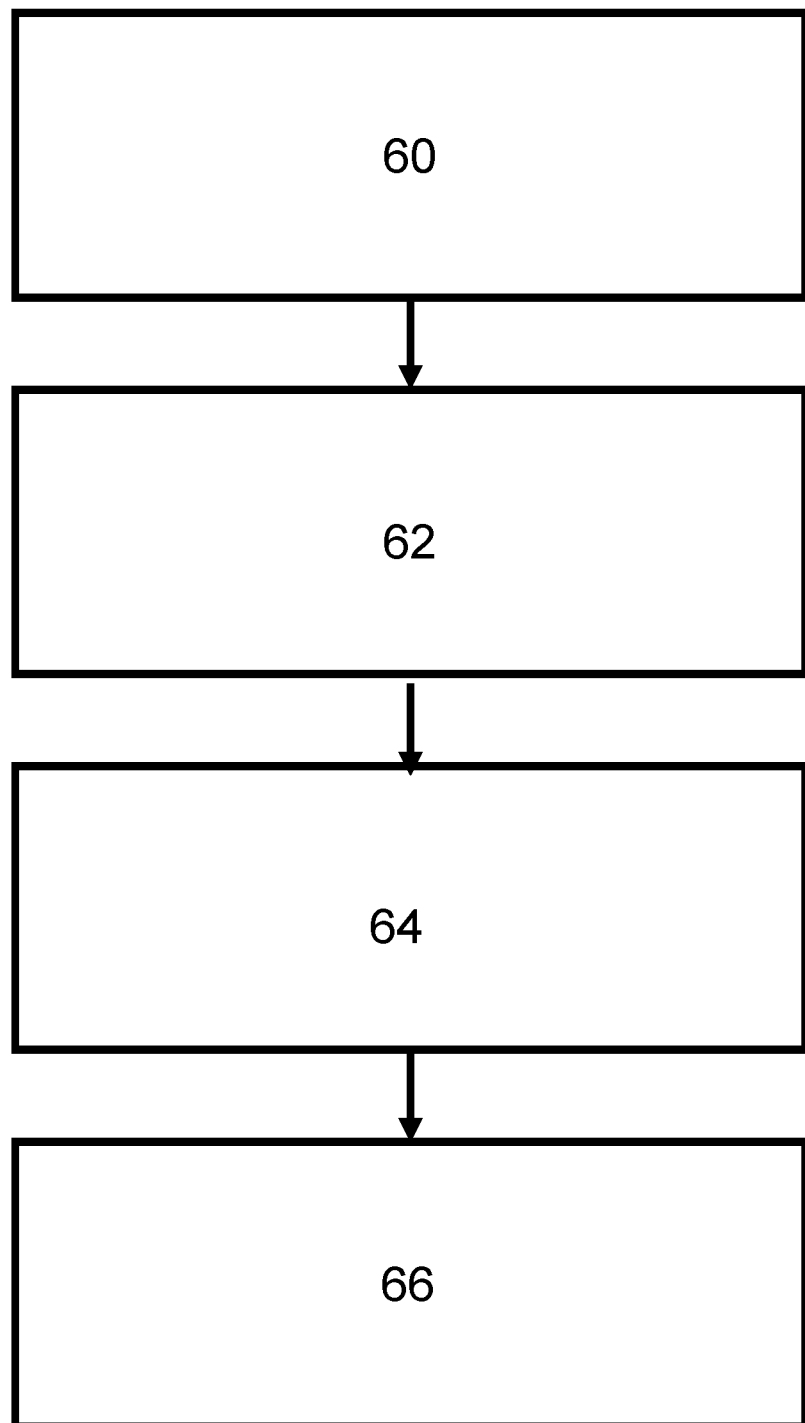
FIG. 7 shows a flowchart in a schematic representation of the method for monitoring and/or controlling a chemical plant with multiple assets.

FIG. 7 shows a flowchart in a schematic representation of the method for monitoring and/or controlling a chemical plant 12 with multiple assets via a distributed computing system 10 as it may be performed in the systems 10 shown in FIGS. 1 to 4.

In a first step 60, the containerized application 48, 50 including an asset or plant template specifying input data, output data and an asset or plant model is provided. The containerized application 48. 50 may be created on the external processing layer 30 or may be modified on the second processing layer 30. An external containerized application from a third party environment may be provided.

In a second step 62, the containerized application 48, 50 is deployed to execute on at least one of the deployment layers 30, 32, 16, 34, 14 wherein the deployment layer 30, 32, 16, 34, 14 is assigned based on the input data, a load indicator, or a system layer tag, and the containerized application 48, 50 may be executed on the assigned deployment layer(s) 30, 32, 16, 34, 14 to generate output data for controlling and/or monitoring the chemical plant 12. Deployment may be managed by an orchestration application 56, 50 that manages deployment of containerized applications 48, 50 based on the input data, the load indicator, or the system layer tag. The orchestration application may be hosted by the second processing layer 16, 23, 34 and/or the external processing layer 30. The orchestration application 56, 58 hosted by the second processing layer 16, 32, 34 manages critical containerized applications 48, 50, wherein the orchestration application 56, 58 hosted by the external processing layer 30 may manage non-critical containerized applications 48, 50. The assignment of the deployment layer 30, 32, 34, 16, 14 may be based on input data depends on a data availability indicator, a criticality indicator or a latency indicator. A containerized application from a third party environment may be deployed to execute on the external processing layer 30.

The orchestration applications 56, 58 may be hosted by the external processing layer 30 and the second processing layer 16 respectively. The orchestration applications 56, 58 may deploy containerized applications 48, 50 on any deployment layer 30, 16, 14. The containerized applications 48, 50 may then be executed on respective deployment layer 30, 16, 14 by running the process applications 46, 52, 54 in a sandbox-type environment. The deployment layer 30, 16, 14 may be assigned based on the input data, the load indicator, or the system layer tag. For instance management of critical containerized applications 50 may be assigned to the second processing layer 16 optionally based on a history criterion reflecting a time window of available historical data on the first or second processing layer 16. Advantageously the containerized applications 48, 50 may be deployed to multiple assets or plants of the same type. Furthermore, the containerized applications 50, 48 may be modified based on the input data and the output data provided by containerized applications 46, 52, 54 executed for multiple assets or plants of the same type.

In a third step 64 the containerized application 48, 50 may be monitored based on a confidence level of the input data, the asset model or the plant model during or after each execution. Based on the resulting confidence level an event signal or modification of the asset or plant model may be triggered. Such Trigger may be set, if the confidence level exceeds a threshold. Such threshold may be pre-defined or dynamic. If a trigger is set, the modification of the asset or plant model may be performed e.g. on the second processing layer 16, 32, 34 or the external processing layer 30.

In a fourth step 66 the generated output data is provided for controlling and/or monitoring the chemical plant 12. Such output data may be passed to a persistent instance after execution of the containerized application 48, 50. In particular such output data may be passed to a controlling instance, e.g. on the first processing layer 14 of the chemical plant 12. Additionally or alternatively such output data may be passed to a monitoring instance on the first processing layer 14, the second processing layer 16, 32, 34 or the external processing layer 30. The output data may be passed to e.g. a client application for display to an operator or a further containerized application 48, 50 for execution.

Figure 8:
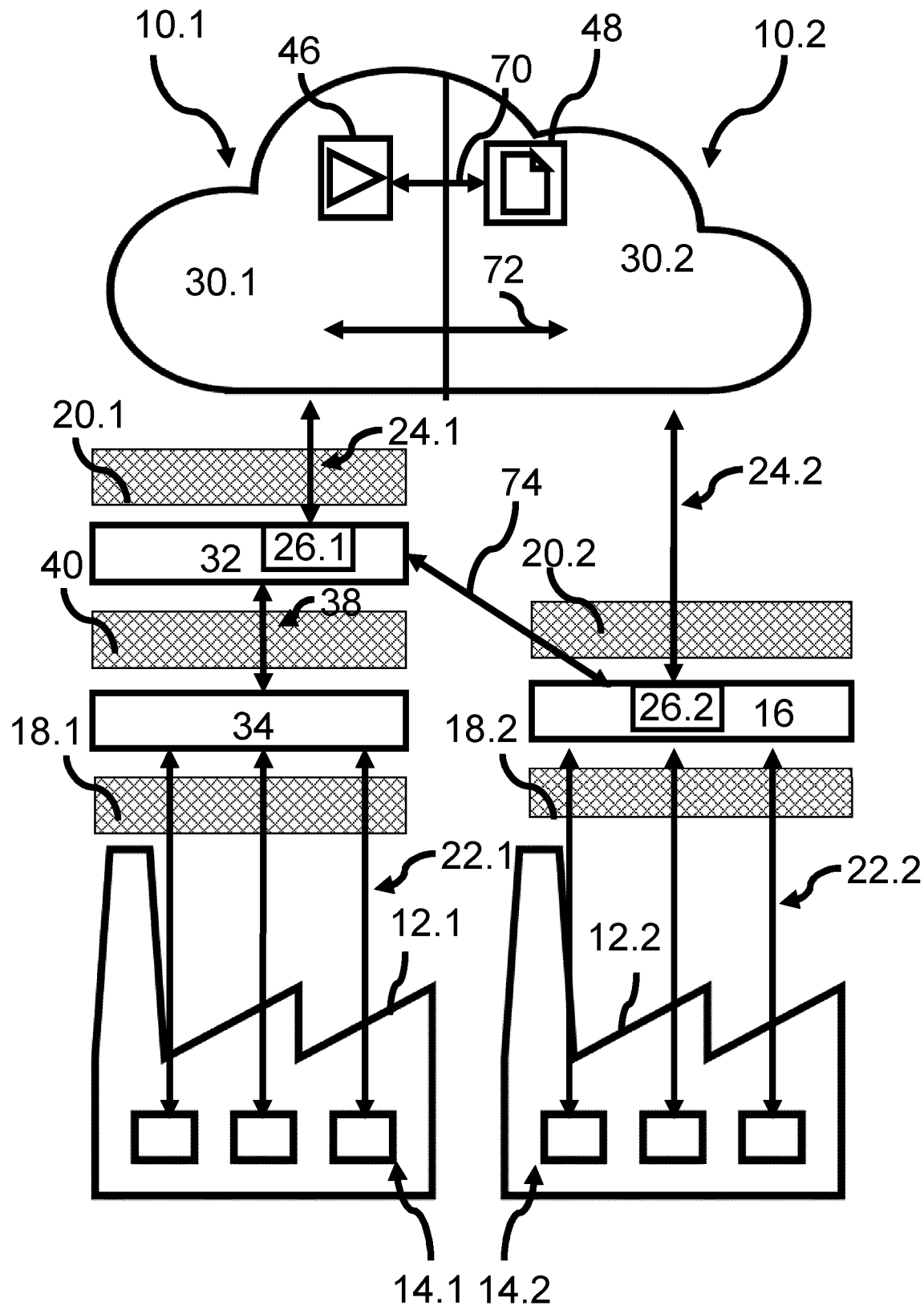
FIG. 8 shows a schematic representation of the system for monitoring and/or controlling more than one chemical plants in different secure networks, which are configured for data and application transfer.

FIG. 8 shows a schematic representation of systems 10.2, 10.2 for monitoring and/or controlling more than one chemical plants 12.1, 12.2 in different secure networks 20.1, 20.2, which are configured for data and process application transfer. FIG. 8 shows systems 10 of FIGS. 1 to 3 including first and second processing layers 14, 16, 32, 34 and the external processing layer 30 as examples. Any other system architecture may be similarly suited for process application and data transfer. Both systems are associated with separate secure networks 20.1, 20.2 and communicatively coupled to an external network 24.1, 24.2 via interfaces 26.1, 26.2.

The systems 10.1, 10.2 are configured to exchange process or asset specific data or the process application based on the transfer tag. By adding the transfer tag on the earliest level possible, i.e. where the data or the application is generated or first enters the system, the transfer tag becomes an inherent part of any data point or application as soon as the tag is added and follows the data or application on its path through the system 10.1, 10.2. Such transfer tag enables seamless, but secure integration of external data sources or external applications as well as transfer of data or application to external resources.

In one case shown in FIG. 8 an application 48 is exchanged between the systems 10.1, 10.2. In this example the containerized application 48 is transferred via the external processing layer 30.1, 30.2 communicatively coupled to the two systems 10.1, 10.2. Here the external processing layer 30.1 is communicatively coupled to system 10.1 and the external processing layer 30.2 is communicatively coupled to system 10.2. The exchange of the containerized application 48 is performed indirectly through the external processing layers 30.1, 30.2. The containerized application is tagged with a transfer tag including two transfer settings relating to confidentiality settings and/or third-party transfer settings. This way the transfer may be allowed or prohibited based on a compliance check on the external processing layer 30.2, e.g. if a transfer with respective third-party identifier is or is not associated with third party identifier stored in a database of allowed third party transfers for the process application 48. Similarly process or asset specific data may be communicated 72 between the systems 10.1, 10.2. Any transfer between the systems 10.1, 10.2 may then be followed by further transfers from the external processing layer 30.1, 30.2 to the respective system 10.1, 10.2.

Additionally, such transfer based on a transfer tag may be conducted directly between the systems 10.1, 10.2 between processing layers 32, 16 associated with the secure networks 20.1, 20.1. Such transfers based on transfer tag may be realized via a secure connection 74 between such layers 16, 23, such as a VPN connection. Any transfer between the systems 10.1, 10.2 may then be followed by further transfers between system components inside the secure networks 20.1, 20.2 or to the external processing layer 30.1, 30.2 of the respective system 10.1, 10.2. By attaching the transfer tag to data points and process application, containerized or not, allows to securely handle third-party transfers between systems 10.1, 10.2 in separate secure networks 20.1, 20.1.

In order to enable controlled communication between systems 10.1, 10.2, the processing layers 32, 16 or external processing layers 30.1, 30.2, process and asset specific data as well as process application may be contextualized with a transfer tag. Here in particular external data or external applications may be added with the transfer tag to control communication in prohibiting or allowing such communication between the systems 10.2 and 10.1. The processing layer 32, 16 or the external processing layers 30.1, 30.2 may be configured to deploy external applications depending on third-party transfer setting signifying internal data ingestion. In such cases external applications, containerized or not, may be safely transmitted between the systems 10.2, 10.2 and the internal data of one system 10.1, 10.2 may be provided to such transmitted application. This way the external application may be executed inside the system 10.1, 10.2, where the data for ingestion by the external application is stored. Execution of the external application may be the processing layer 32, 16 or the external processing layers 30.1, 30.2. The processing layer 32, 16 or the external processing layers 30.1, 30.2 may be configured to contextualize internal applications by adding the third-party transfer setting signifying external data ingestion. External data may be safely transmitted between the systems 10.2, 10.2 based on the transfer tag and the internal application of one system 10.1, 10.2 may be provided with such external data. The processing layer 32, 16 or the external processing layers 30.1, 30.2 may be configured to deploy internal applications depending on the third-party transfer setting of the external data ingestion. This way the internal application may be executed inside the system 10.1, 10.2, where the data for ingestion by the internal application is transmitted to. Execution may run on the processing layers 32, 16 or the external processing layers 30.1, 30.2.

Any of the components described herein used for implementing the methods described herein may be in a form of a distributed computer system having one or more processing devices capable of executing computer instructions. Components of the computer system may be communicatively coupled (e.g., networked) to other machines in a local area network, a secure network, an intranet, an extranet, or the Internet. Components of the computer system may operate as a peer machines in a peer-to-peer (or distributed) network environment. Parts of the computer system may be a virtualized cloud computing environment, edge gate ways, web appliances, servers, network router, switch or bridge, or any machine capable of executing a set of instructions (sequential or otherwise) that specify actions to be taken by that machine. Further, it is to be understood that the terms "computer system," "machine," "electronic circuitry," and the like are not necessarily limited to a single component, and shall be taken to include any collection of machines that individually or jointly execute a set (or multiple sets) of instructions to perform any one or more of the methodologies discussed herein.

Some or all of the components of such a computer system may be utilized by or illustrative of any of the components of the system 10. In some embodiments, one or more of these components may be distributed among multiple devices or may be consolidated into fewer devices than illustrated. Furthermore, some components may refer to physical components realized in hardware and others may refer to virtual components realized in software on remote hardware.

Any processing layer may include a general-purpose processing device such as a microprocessor, microcontroller, central processing unit, or the like. More particularly, the processing layers may include a CISC (Complex Instruction Set Computing) microprocessor, RISC (Reduced Instruction Set Computing) microprocessor, VLIW (Very Long Instruction Word) microprocessor, or a processor implementing other instruction sets or processors implementing a combination of instruction sets. The processing layer may also include one or more special-purpose processing devices such as an ASIC (Application-Specific Integrated Circuit), an FPGA (Field Programmable Gate Array), a CPLD (Complex Programmable Logic Device), a DSP (Digital Signal Processor), a network processor, or the like. The methods, systems and devices described herein may be implemented as software in a DSP, in a micro-controller, or in any other side-processor or as hardware circuit within an ASIC, CPLD, or FPGA. It is to be understood that the term "processing layer" may also refer to one or more processing devices, such as a distributed system of processing devices located across multiple computer systems (e.g., cloud computing), and is not limited to a single device unless otherwise specified.

Any processing layer may include suitable data storage device like a computer-readable storage medium on which is stored one or more sets of instructions (e.g., software) embodying any one or more of the methodologies or functions described herein. The instructions may also reside, completely or at least partially, within the main memory and/or within the processor during execution thereof by the computer system, main memory, and processing device, which may constitute computer-readable storage media. The instructions may further be transmitted or received over a network via a network interface device.

A computer program for implementing one or more of the embodiments described herein may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network.

The terms "computer-readable storage medium," "machine-readable storage medium," and the like should be taken to include a single medium or multiple medium (e.g., a centralized or distributed database, and/or associated caches and servers) that store the one or more sets of instructions. The terms "computer-readable storage medium," "machine-readable storage medium," and the like shall also be taken to include any transitory or non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Some portions of the detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities.

Unless specifically stated otherwise as apparent from the preceding discussion, it is appreciated that throughout the description, discussions utilizing terms such as "receiving," "retrieving," "transmitting," "computing," "generating," "adding," "subtracting," "multiplying," "dividing," "selecting," "optimizing," "calibrating," "detecting," "storing," "performing," "analyzing," "determining," "enabling," "identifying," "modifying," "transforming," "applying," "extracting," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

It has to be noted that embodiments of the invention are described with reference to different subject matters. In particular, some embodiments are described with reference to method type claims whereas other embodiments are described with reference to the system type claims.

However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or example and not restrictive; the invention is not limited to the disclosed embodiments. Other variations to the disclosed embodiments can be understood and effected by those skilled in the art and practicing the claimed invention, from a study of the drawings, the disclosure, and the appended claims. In some instances, well-known structures and devices are shown in block diagram form, rather than in detail, in order to avoid obscuring the present disclosure.

In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A system configured to monitor and/or control one or more chemical plant(s) including at least one processing layer, wherein the at least one processing layer includes a first processing layer and a second processing layer, wherein the at least one processing layer is associated with a secure network and communicatively coupled to an interface for providing process or asset specific data to an external processing layer, wherein the at least one processing layer is configured to add a transfer tag to the process or asset specific data and to provide the process or asset specific data based on the transfer tag, wherein the second processing layer includes an intermediate processing system and a process management system, the intermediate processing system is configured to collect process or asset specific data provided by the first processing layer, the process management system is configured to provide plant specific data of one or more chemical plant(s) to the interface, process or asset specific data refers to data relating to a specific asset or process and contextualized with respect to such specific asset or process, the contextualization of the process or asset specific data relates to context available on the first processing layer, plant specific data refers to process or asset specific data that is contextualized with respect to one or more plant(s), the contextualization of the plant specific data relates to context available on the second processing layer, plant specific data refers to contextualized process or asset specific data.

2. The system of claim 1, wherein the first processing layer and the second processing layer are associated with the secure network and optionally an external processing layer, wherein the external processing layer is configured to add a transfer tag to the process or asset specific data or to the process application and to provide the process or asset specific data or the process application based on the transfer tag.

3. The system of claim 2, wherein the first processing layer is configured to contextualize the process or asset specific data by adding the transfer tag.

4. The system of claim 1, wherein the processing layer is configured to add a transfer tag to the process or asset specific data on generation or on entry point into the system or the processing layer.

5. The system of claim 1, wherein the transfer tag includes at least two transfer settings, wherein the at least two transfer settings relate to the confidentiality settings and/or third-party transfer settings.

6. The system of claim 1, wherein the processing layer or the external processing layer is configured to provide contextualized process and asset data to a third-party system based on the transfer tag.

7. The system of claim 6, wherein the processing layer or the external processing layer is configured to perform a third-party compliance check before transfer to a third-party system.

8. The system of claim 6, wherein the processing layer or the external processing layer is configured to access a third-party compliance database and to determine transfer compliance based on the third-party transfer setting including a third-party identifier and at least one information category.

9. The system of claim 1, wherein the processing layer or the external processing layer is configured to receive external data or external applications.

10. The system of claim 1, wherein the processing layer or the external processing layer is configured to contextualize external data or external applications by adding the transfer tag.

11. The system of claim 1, wherein the processing layer or the external processing layer is configured to deploy external applications depending on third-party transfer setting signifying internal data ingestion.

12. The system of claim 1, wherein the processing layer or the external processing layer is configured to contextualize internal applications by adding the third-party transfer setting signifying external data ingestion.

13. The system of claim 1, wherein the processing layer or the external processing layer is configured to deploy internal applications depending on the third-party transfer setting of the external data ingestion.

14. The system of claim 1, wherein the processing layer or the external processing layer is configured to initiate, prevent or control the process of providing process or asset specific data or process applications according to the transfer tag.

15. A method for monitoring and/or controlling one or more chemical plants including at least one processing layer, wherein the at least one processing layer includes a first processing layer and a second processing layer, wherein the at least one processing layer is associated with a secure network and communicatively coupled to an interface for providing process or asset specific data to an external processing layer, wherein the method comprises:
adding a transfer tag, via the at least one processing layer, to the process or asset specific data and
providing the process or asset specific data, via the at least one processing layer, based on the transfer tag,
wherein the second processing layer includes an intermediate processing system and a process management system, and
collecting, by the intermediate processing system, process or asset specific data provided by the first processing layer,
providing, by the process management system, plant specific data of one or more chemical plant(s) to the interface,
and wherein process or asset specific data refers to data relating to a specific asset or process and contextualized with respect to such specific asset or process, the contextualization of the process or asset specific data relates to context available on the first processing layer, plant specific data refers to process or asset specific data that is contextualized with respect to one or more plant(s), the contextualization of the plant specific data relates to context available on the second processing layer, plant specific data refers to contextualized process or asset specific data.

* * * * *